United States Patent [19]
Murai

[11] Patent Number: 5,293,673
[45] Date of Patent: Mar. 15, 1994

[54] STRAP FASTENER
[75] Inventor: Ryukichi Murai, Toyama, Japan
[73] Assignee: Yoshida Kogyo K. K., Tokyo, Japan
[21] Appl. No.: 78,036
[22] Filed: Jun. 18, 1993
[30] Foreign Application Priority Data
  Jun. 18, 1992 [JP] Japan .............................. 4-048636[U]
  Feb. 19, 1993 [JP] Japan .............................. 5-011296[U]
[51] Int. Cl.⁵ ............................................. A44B 13/00
[52] U.S. Cl. ................................. 24/600.4; 24/600.7
[58] Field of Search ............... 24/600.4, 600.5, 600.7,
                                        24/598.7; 294/82.23

[56] References Cited
U.S. PATENT DOCUMENTS

| Re. 31,096 | 12/1982 | Johnston | 24/600.4 |
| 2,571,971 | 10/1951 | Vogel | 24/600.5 |
| 2,592,506 | 4/1952 | Yanagihara | 24/600.4 |
| 2,896,290 | 7/1959 | Salm et al. | 24/600.4 |
| 3,350,753 | 11/1967 | Hester | 24/600.7 |

FOREIGN PATENT DOCUMENTS

| 0961227 | 4/1957 | Fed. Rep. of Germany | 24/600.4 |
| 62-39285 | 8/1987 | Japan | |

Primary Examiner—Victor N. Sakran
Attorney, Agent, or Firm—Hill, Steadman & Simpson

[57] ABSTRACT

A strap fastener for releasably connecting a strap, cord or belt on a garment article is disclosed, the fastener comprising a base member, a strap retainer member and a slider. The base member has an upper plate and a lower plate defining therebetween a guide channel through which the slider is movable. The slider has a guide rail at such a lower edge of a side flange which lies above the lower surface of the base member. A hook is formed, extending integrally from the lower plate of the base and releasably engageable with the slider through a ridge-and-groove formation alternately provided on the hook and the slider.

5 Claims, 7 Drawing Sheets

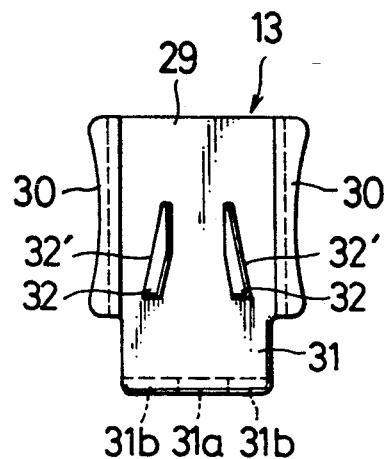
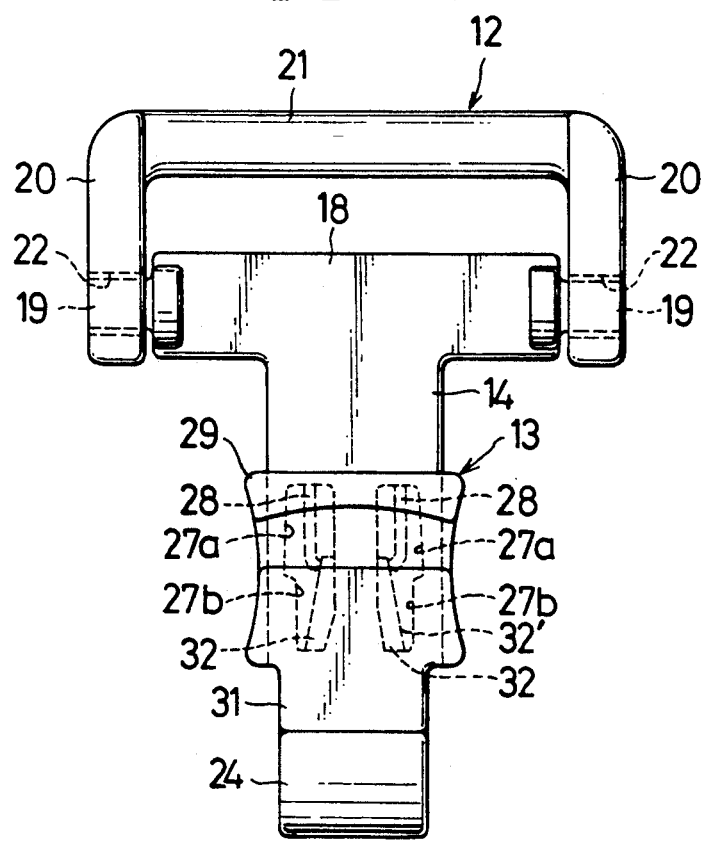

STRAP FASTENER

BACKGROUND OF THE INVENTION

1. Field of the Invention

This invention relates to a strap fastener for releasably connecting a strap, cord or belt on a garment article such as a bag, sack, sports wear and the like.

2. Prior Art

There are known numerous fastening devices for releasably connecting opposite terminal ends of an elongate strap or belt attached to a bag or other garment articles. A typical example of one such fastening device over and relating to which the present invention contemplates an improvement is disclosed in Japanese Patent Publication No. 62-39285 in which it was proposed to use a fastening device in the form of a plastic snap hook engageable with a ring attached to a handbag, a sack or the like. The snap hook is comprised of a base member having at one of its ends a folded-back hook portion, at the other end a resilient plate-like tongue portion and a slider movable over and along the tongue portion between a position in which the hook is open and a position in which the hook is closed, the arrangement being that the slider is urged by the resilient force of the tongue normally toward the hook to close the latter and moved by the wearer's fingers against the tension of the tongue retractively away from the hook to open the latter. Since the slider is arranged to reciprocate with its lower peripheral wall protruding beyond the lower surface of the base member, the portion of the snap hook at which the slider is connected to the base member becomes objectionably thick and bulky making the whole device look unsightly, a disadvantage particularly where the snap hook is used in connection with a ladies' shoulder-bag or similar ornamental garment article. Another drawback of the prior art device is that since the plate-like tongue yields a relatively strong resilient action upon the slider to urge the latter into snapping engagement with the hook, so much finger pressure is required to retract the slider away from the hook to provide an opening for inserting therethrough the connecting ring of the bag.

SUMMARY OF THE INVENTION

The present invention seeks to provide a strap fastener which has structural features such that will eliminate or alleviate the foregoing drawbacks of the prior art and which is relatively simple in construction and reliable in operation.

More specifically, the invention seeks to provide a strap fastener comprised of a slider and a hook which requires a relatively small amount of force to move the slider away from the hook and which has a relatively low structural profile leading to attractive product appearance.

The invention further seeks to provide a strap fastener comprised of a slider and a hook which includes means of holding the slider and the hook securely in interengaged relation against torsional stresses.

The above and other objects and features of the invention will be better understood from the following detailed description taken in connection with the accompanying drawings which illustrate by way of example a preferred embodiment.

According to the invention, there is provided a strap fastener which comprises: a base member having an upper plate and a lower plate spaced apart from each other to define therebetween a guide chamber, the upper plate having a pair of slits and a pair of cantilevered resilient strips elastically deformably supported therein; a strap retainer member connected to one end of the base member for receiving and retaining a loose end of a strap; a hook connected to the opposite end of the base member and extending integrally from the lower plate; and a slider having a base plate having side flanges including inwardly directed guide rails slidably movable in the guide channel and lying above the lower surface of the base member, a ledge extending integrally centrally from the base plate between the side flanges and releasably engageable with the hook and a pair of spaced engaging ribs diverging toward the ledge and adapted to engage the resilient strips.

BRIEF DESCRIPTION OF THE DRAWINGS

FIG. 4 is a back plan view of a slider constituting part of the strap fastener;

FIG. 5 is a plan view of the strap fastener mounted with the slider shown being engaged with a hook;

Like reference numerals refer to like or corresponding parts throughout the several views.

DETAILED DESCRIPTION OF THE INVENTION

Figure 1:
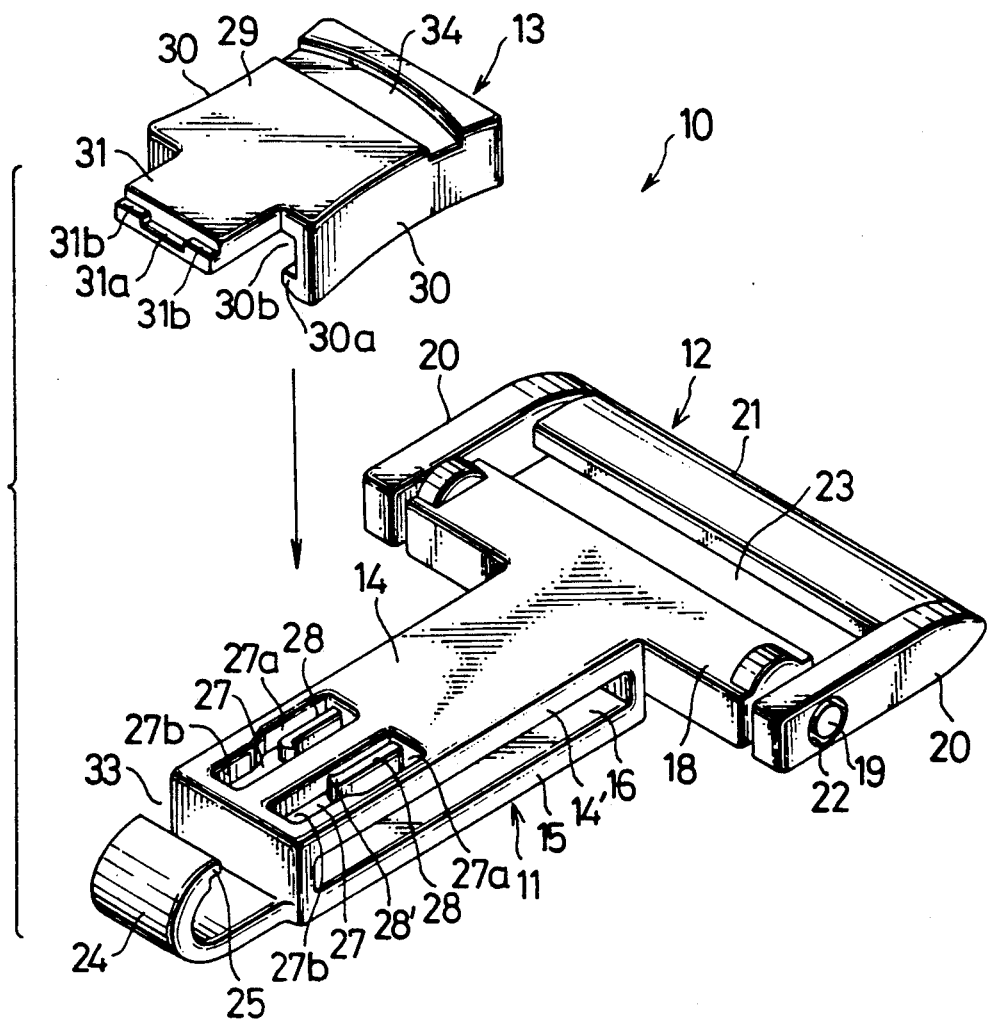
FIG. 1 is an exploded perspective view of a strap fastener embodying the invention.
Figure 2:
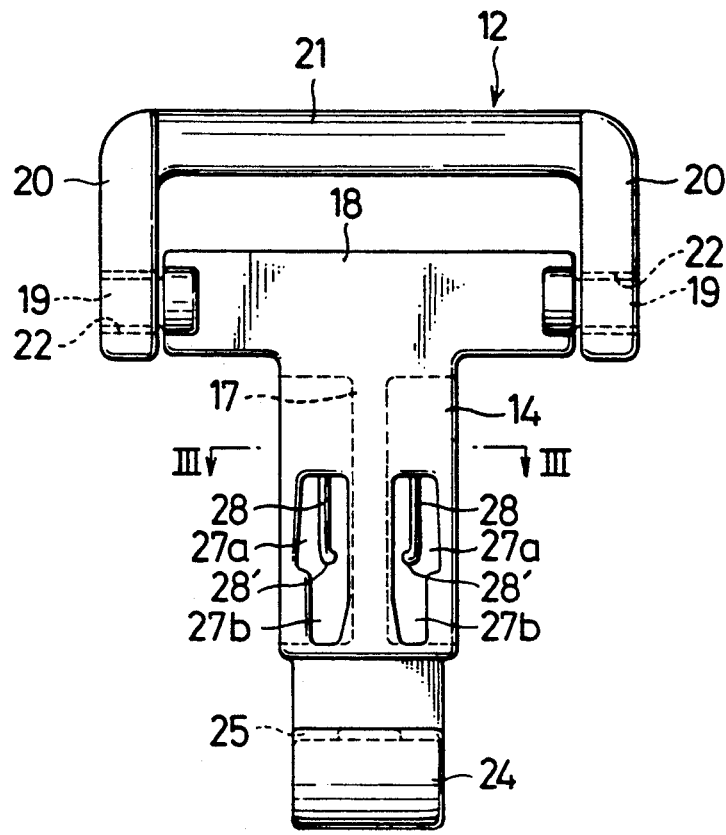
FIG. 2 is a plan view of the same.

Referring now to the drawings and FIG. 1 in particular, there is shown a strap fastener 10 which essentially comprises a support base member 11, a strap retainer member 12 connected to one end of the base member 11 and a slider member 13 slidably mounted on the base member 11, all these component members being formed from a suitable plastic material to enable certain of their operative parts to undergo elastic deformation as hereinafter described.

Figure 3:
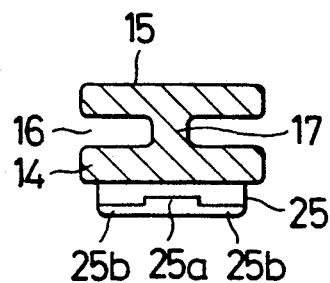
FIG. 3 is a cross-sectional view taken on the line III— III of FIG. 2.

The base member 11 is in the form of a rectangular casing having an upper plate 14 and a lower plate 15 spaced apart in parallel to define therebetween a guide channel 16 which is subdivided into identical halves (FIG. 3) by a partition wall 17 extending centrally longitudinally of the base 11 and joining together the upper and lower plates 14, 15.

A connecting bar 18 is formed, extending integrally transversely of the base 11 at one end thereof and provided with a transverse pin 19 projecting slightly from opposite ends of the bar 18.

The strap retainer member 12 has a pair of arms 20, 20 interconnected at one ends thereof by a transverse cross bar 21 and provided at the opposite ends with bores 22, 22 for receiving rotatably therein the pin 19 of the connecting bar 18. The cross bar 21 extends in parallel spaced relation to and defines with the connecting bar 18 an elongate transverse slot 23 for receiving and retaining one loose end of a strap or belt S (FIG. 8).

Figure 8:
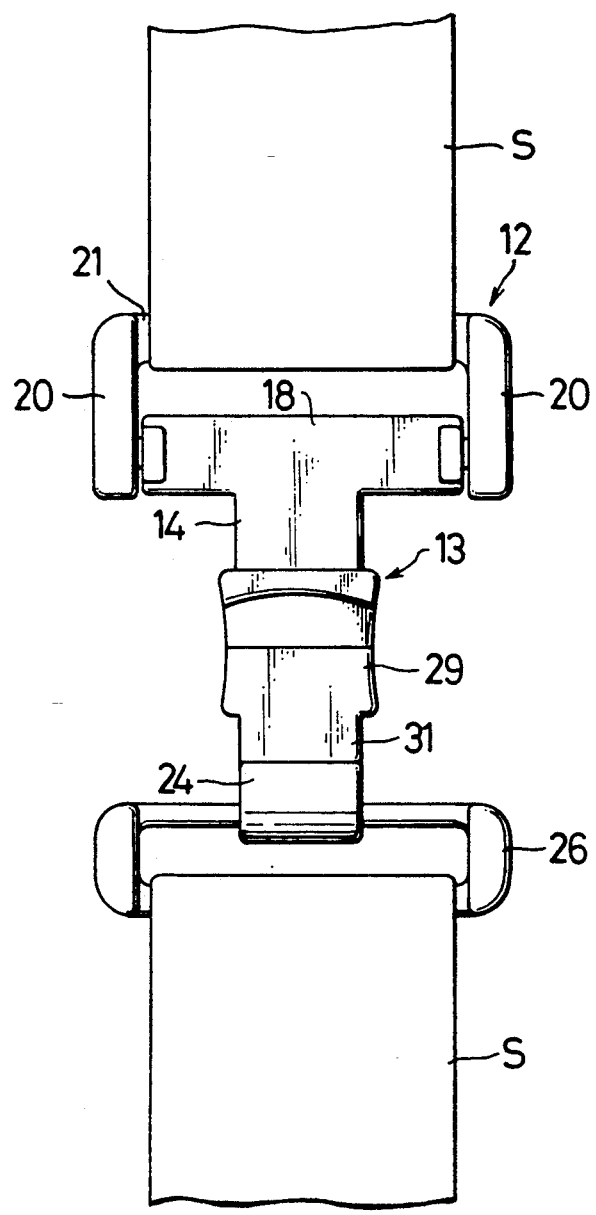
FIG. 8 is a plan view of the strap fastener shown connected with a mating coupling member on the opposite end of the strap.

At the opposite end of the base 11 remote from the connecting bar 18 is formed a resilient tongue 24 which extends integrally from the lower plate 15 of the base 11 and is folded back to form a hook 25 at a level higher than the guide channel 16 (as better shown in FIG. 6) for engagement with a mating strap retainer or coupling device 26 (FIG. 8). The hook 25 is provided at its distal end with an engaging ridge 25a and a pair of engaging grooves 25b, 25b on opposite sides thereof as better shown in FIG. 3.

The upper plate 14 of the base 11 is provided adjacent to an end thereof remote from the connecting bar 18 with a pair of spaced parallel elongate slits 27, 27 each consisting of a wide portion 27a and a narrow portion 27b.

A pair of relatively thin cantilevered resilient strips 28, 28 integral with the upper plate 14 of the base 11 extend in parallel relation within the wide portions 27a, 27a and terminate short of the narrow portions 27b, 27b of the respective slits 27, 27. The cantilevered resilient strips 28, 28 have respective prongs 28', 28' directed inwardly toward each other for purposes hereinafter to be described.

The slider member 13 generally in the form of a rectangular bottomless box comprises a base plate 29 and a pair of inwardly arcuately curved side flanges 30, 30 integral therewith having respective inwardly directed guide rail portions 30a, 30a defining with the lower surface of the plate 29 respective guide recesses 30b, 30b dimensioned to receive opposite longitudinal edges 14' of the upper plate 14. Thus, the slider 13, when mounted on the base 11, is slidably movable along the base 11 with its flanges 30, 30 held astride the longitudinal edges 14' of the plate 14 and with its guide rail portions 30a, 30a received within the guide channel 16 lying above and not protruding beyond the lower surface of the base 11, the arrangement being contributory to reduction in the thickness of the strap fastener as a whole, leading to a relatively low profile as better shown in FIG. 6.

Figure 6:
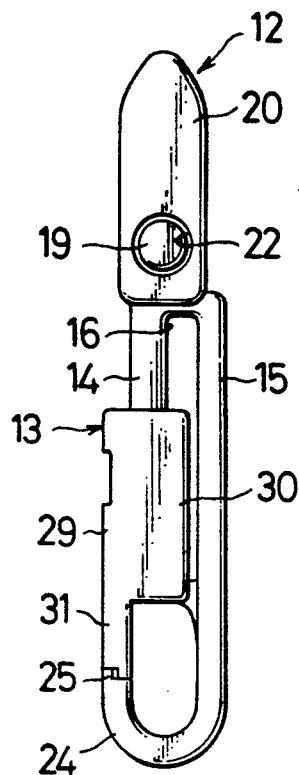
FIG. 6 is a side elevational view of the strap fastener shown in FIG. 5.
Figure 7:
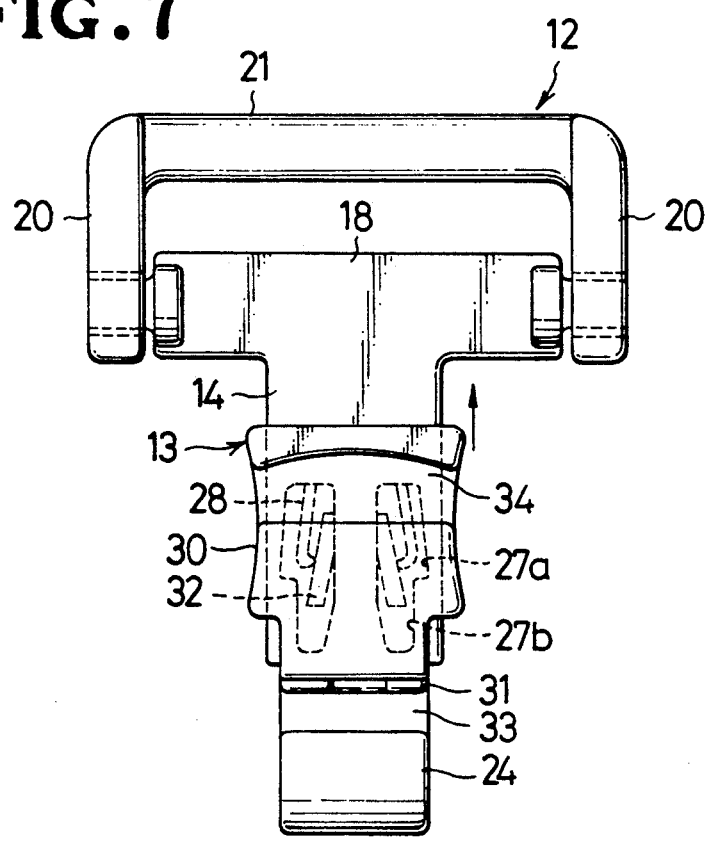
FIG. 7 is a view similar to FIG. 5 but showing the slider being disengaged from the hook.

At one or front end of the slider 13 is formed a ledge 31 protruding centrally from one end of the plate 29 between the two side flanges 30, 30 and having at its distal end an engaging groove 31a and a pair of engaging ridges 31b, 31b on opposite sides thereof, the groove 31a and the engaging ridges 31b, 31b being dimensioned to be fittingly interengageable with the ridge 25a and the grooves 25b, 25b, respectively, of the hook 25 as shown in FIGS. 5, 6 and 7, this ridge and groove formation constituting a means according to the invention for holding the slider 13 and the hook 25 securely in interengaged relation against torsional stresses which would otherwise result in separation of the slider 13 from the body of the strap fastener 10.

The slider 13 is further provided in the lower surface of its plate member 29 with a pair of spaced engaging ribs 32, 32 diverging toward the ledge 31 and having outer guide surfaces 32', 32' as shown in FIG. 4, the ribs 32, 32 being adapted to engage receptively in the respective slits 27, 27 formed in the upper plate 14 of the base 11.

With this construction, the slider 13 is mounted on the base 11 of the strap fastener 10 by bringing the engaging ribs 32, 32 into registry with corresponding slits 27, 27 and depressing the slider 13 so that the ribs 32, 32 engage resiliently with respective resilient strips 28, 28 in the slits 27, 27, in which instance the guide rails 30a, 30a is likewise resiliently received in and rendered movable along the guide channel 16 of the base 11. Consequently, the slider 13 is urged to move forward toward the tongue 24 under the influence of biasing action of the resilient strips 28, 28 tending to urge the ribs 32, 32 to move all way up till they abut against the end walls of the slits 27, 27 in the narrow portions 27b, 27b thereof, at which time the ledge 31 of the slider 13 is coupled together with the hook 25 on the base 11 with ridge 25a and grooves 25b, 25b interengaged with mating groove 31a and ridges 31b, 31b, respectively, as illustrated in FIGS. 5 and 6, thus closing a gap 33 between the ledge 31 and the hook 25 which would otherwise be open for inserting the coupling device 26 (FIG. 8).

When connecting the mating coupling device 26 to the strap fastener 10 of the invention as despicted in FIG. 8, this is done by moving the slider 13 backward toward the connecting bar 18 of the base 11 with the wearer's fingers gripping the side flanges 30, 30 and/or a transverse groove 34 in the upper surface of the slider 13. This retractive movement of the slider 13 causes the ledge 31 to disengage from the hook 25 to reveal the gap 33 therebetween and simultaneously the resilient strips 28, 28 to elastically spread against their tension within the wide portions 27a, 27a of the slits 27, 27 as the engaging ribs 32, 32 slide back with their guide surfaces 32', 32' held in contact with the prongs 28', 28' of the resilient strips 28, 28, as shown in FIG. 7.

Releasing the finger pressure will allow the resilient strips 28, 28 to restore to the original position by their own resiliency whereby the engaging ribs 32, 32 are biased to move forward and snap into the narrow portions 27b, 27b of the slits 27, 27 until the gap 33 is closed, as shown in FIGS. 5 and 6.

In the above reciprocating movement of the slider 13 relative to the base 11, it is to a great advantage that a pull force required to retract the slider 13 is very small compared to the prior art discussed at the outset of this specification and that the provision of alternate ridge and groove engagement (25a, 25b, 25b, and 31a, 31b, 31b) of the ledge 31 with the hook 25 ensures freedom of deformation of these parts when subjected to torsional stresses.

Figure 9:
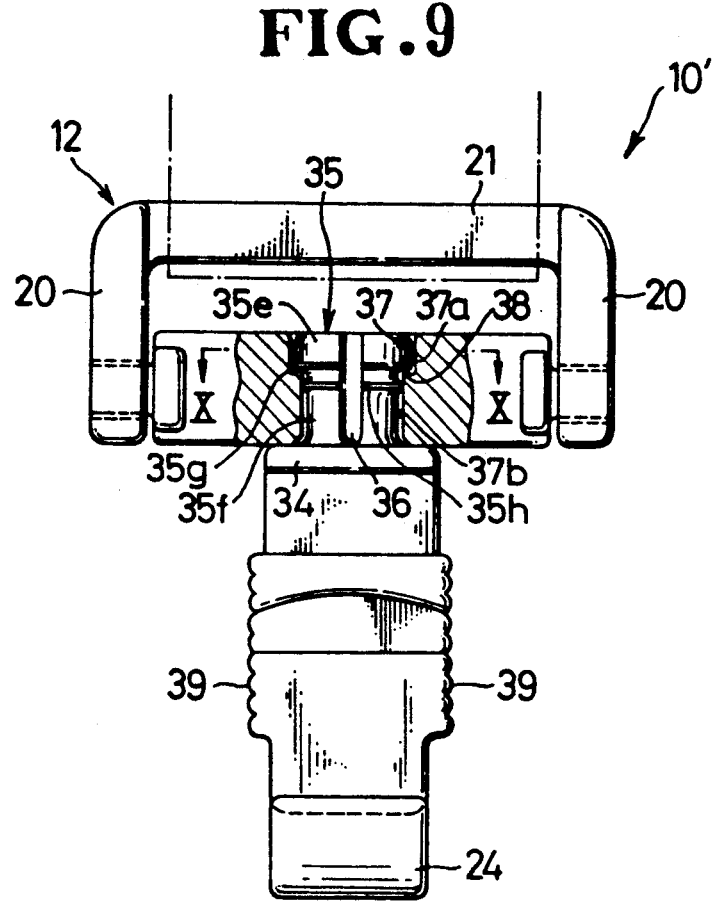
FIG. 9 is a plan view of a modified form of strap fastener according to the invention.
Figure 10:
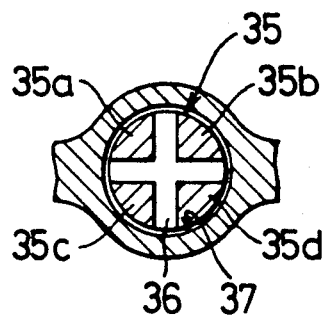
FIG 10 is a cross-sectional view taken on the line X —X of FIG. 9.
Figure 11:
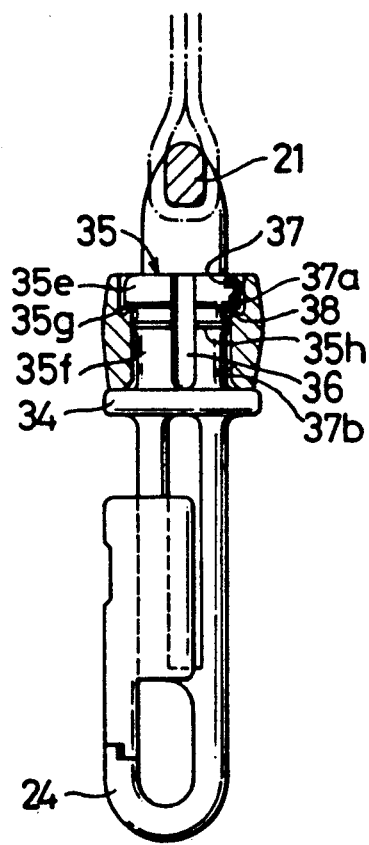
FIG. 11 is a side elevational view of the strap fastener shown in FIG. 9.

Reference to FIGS. 9 and 10 shows a modified form of strap fastener 10' according to the invention. This modified strap fastener 10' differs from the first advanced strap fastener 10 in that the base member 11 is made rotatable relative to the retainer member 12 so that the strap S wound on the cross bar 21 can be held free from getting twisted when external stresses are applied to the fastener 10'. The base member 11 is provided at one end thereof with a circular flange 34 for abutting engagement with the connecting bar 18 and an engaging pin 35 integral with the flange 34 and extending axially of the base member 11. As better shown in FIG. 10, the pin 35 is subdivided internally by a crisscross slit 36 into four sections 35a–35d which are rendered radially contractible and expansible. As viewed in FIGS. 9 and 11, the pin 35 is divided externally into an upper larger annular portion 35e and a lower smaller annular portion 35f, the upper annular portion 35e having a lower peripheral edge 35g extending circumferentially slightly beyond the lower annular portion 35f, and the lower annular portion 35f having a circumferentially protruding annular rib 35h.

The connecting bar 18 is provided centrally with a transversely extending annular aperture 37 which is divided into an upper larger-diameter portion 37a and a lower smaller-diameter portion 37b, the upper portion 37a having its lower peripheral edge radially inwardly directed as defined by an annular projection 38 of the inner wall of the aperture 37.

The base member 11 is pivotably connected to the retainer member 12 by inserting the engaging pin 35 into the aperture 37 until the flange 34 rests against the connecting bar 18, in which instance the upper annular portion 35e of the pin 35 contracts on passage through the lower portion 37b of the aperture 37 and expands to its original dimension upon entry into the upper portion 37a of the aperture 37, when the peripheral edge 35g of the pin 35 is seated on the annular projection 38 of the aperture wall.

The base member 11 thus connected to the retainer member is allowed to rotate through 360°, in which instance the annular rib 35h around the lower portion 35f of the pin 35 is held in contact with the wall of the lower portion 37b of the aperture 37 and serves to prevent the lower subdivided section 35c and 35d from collapsing.

The modified strap fastener 10' further features the provision of toothed side flanges 39, 39 in place of the arcuately curved flanges 30, 30 for facilitating the manipulation of the slider member 13 as shown in FIG. 9.

Obviously, various modifications and variations of the present invention are possible in the light of the above teaching. It is therefore to be understood that within the scope of the appended claims the invention may be practiced otherwise than as specifically described.

What is claimed is:

1. A strap fastener which comprises:

(i) a base member having an upper plate and a lower plate spaced apart from each other to define therebetween a guide chamber, said upper plate having a pair of slits and a pair of cantilevered resilient strips elastically deformably supported therein;
   (ii) a strap retainer member connected to one end of said base member for receiving and retaining a loose end of a strap;
   (iii) a hook connected to the opposite end of said base member and extending integrally from said lower plate; and
   (iv) a slider having a base plate having side flanges including inwardly directed guide rails slidably movable in said guide channel and lying above the lower surface of said base member, a ledge extending integrally centrally from said base plate between said side flanges and releasably engageable with said hook and a pair of spaced engaging ribs diverging toward said ledge and adapted to engage said resilient strips.

2. A strap fastener according to claim 1 wherein said hook is provided with a ridge and a pair of grooves on opposite sides thereof, and said ledge is provided with a groove and a pair of ridges on opposite sides thereof for releasably engaging said ridge and said pair of grooves, respectively, of said hook.

3. A strap fastener according to claim 1 wherein said slider is mounted slidably astride said upper plate of said base member.

4. A strap fastener according to claim 1 wherein said resilient strips each have inwardly directed prongs for engagement respectively with said engaging ribs of said slider.

5. A strap fastener according to claim 1 wherein said base member is provided with an engaging pin extending axially from one of its ends and said retainer member is provided with an annular aperture for rotatably receiving said engaging pin.

* * * * *